Nov. 10, 1936.  A. LINGG ET AL  2,060,089
COMBINATION OF CAMERA AND EXPOSURE METER
Filed Oct. 23, 1934
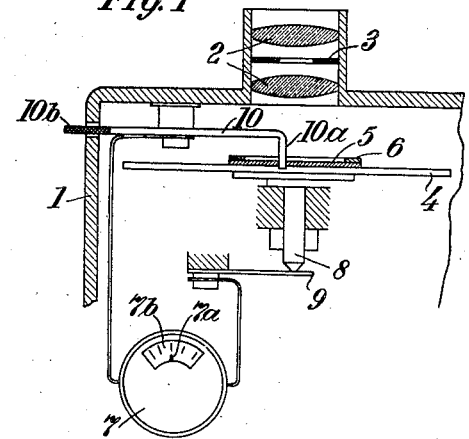
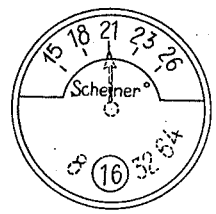
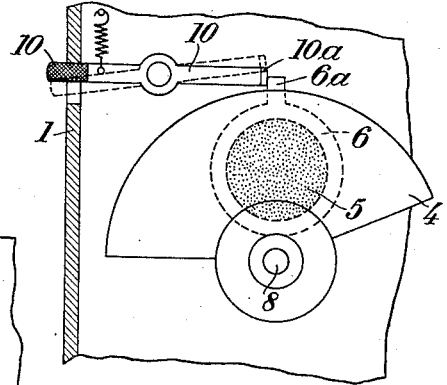
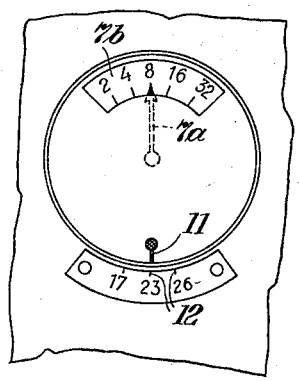
Inventors:
Alfred Lingg,
Siegfried Gaulhs,
By Attorney Philip S. Hopkins.

Patented Nov. 10, 1936

2,060,089

UNITED STATES PATENT OFFICE 2,060,089

COMBINATION OF CAMERA AND EXPOSURE METER

Alfred Lingg and Siegfried Gelius, Munich, Germany, assignors to Agfa Ansco Corporation, Binghamton, N. Y., a corporation of New York Application October 23, 1934, Serial No. 749,635
In Germany October 28, 1933

4 Claims. (Cl. 88—16)

Our present invention relates to a camera which is provided with an exposure meter.

One of its objects is an improved combination of the shutter of a camera with a photo-cell which is simple and efficient. Another object is the provision of such a device which needs little space. Further objects will be seen from the detailed specification following hereinafter. Reference is made to the accompanying drawing in which Fig. 1 shows a sectional plan of the front part of a cinematographic camera with a rectifier photo-cell and a measuring instrument installed therein, Fig 2 shows a rear view of the shutter and stop device in the camera, and Figs. 3 and 4 are detailed views of the scale of the measuring instruments.

The idea of connecting rigidly with a camera a photo-cell and the measuring instrument belonging thereto, is in itself not novel. Apparatus has been described in which a positive coupling connects the indicator of the exposure meter with the device for adjusting the diaphragm.

We have found that the use of a rectifier photo-cell (see, for instance, The Journal of the Institution of Electrical Engineers, vol. 72 (1933), page 5) in a cinematographic camera is particularly suitable because in the first place the exposure is constant and accordingly only the diaphragm has to be regulated and secondly the box form of construction is particularly advantageous for the housing of an instrument. Thus, it is possible to use the invention with advantage also for the usual photographic camera of the box type, but it may also be used with other photographic cameras.

According to a modification of the invention the rotary shutter of a moving picture camera is formed entirely or partly as a rectifier cell or such a cell is attached to the shutter. The measuring instrument is conductively connected with the rectifier cell on the one hand through the body of the camera, and on the other hand through an insulated conductor, preferably the stop device which holds the shutter at rest. The arrested position of the shutter is that in which the rectifier cell is in front of the objective aperture.

The access of light to the rectifier cell can be adjusted by means of the objective diaphragm, that is to say this adjustment is made in each particular case up to a constant value which indicates the correct exposure in conformity with the sensitivity of the film material used.

The arrangement described has the advantage of maximum economy of space as no additional room is required for the photo-cell. The apparatus can even be fitted in or on an existing camera. Furthermore, it is possible for the scale of the measuring instrument to be arranged directly at the side of the peep-aperture of the view finder or for it to be arranged in or beside the path of vision through the view-finder, that is to say, at a place where it is possible to read the scale simultaneously with or immediately after viewing the sighted object. The apparatus thus offers the advantage that the access of light to the cell is dependent on the angle subtended by the picture being photographed and that, in general, only the brightness of the picture is measured, secondary light being completely eliminated. The access of light is also dependent on the diaphragm aperture at the moment.

The invention will now be described with reference to the accompanying drawing.

Referring to Fig. 1, I is the cinematographic camera and 2 is the objective containing the diaphragm 3; the rotary shutter 4 is mounted inside the camera.

On the sector constituting the shutter, which generally consists of thin plate steel, there is provided a thin layer 5 of a semi-conductor, for example a selenide. On the semi-conductor layer 5 there is provided an aluminium ring 6 or a gauze net. The aluminium ring 6 may be formed by a spraying operation. The photo-electric cell thus provided is connected through the body of the camera with the measuring instrument 7, the current passing from the rotary to the stationary part, for example through the end 8 of the shutter shaft, against which bears a stationary flexible tongue 9. When the shutter is arrested, the circuit of the measuring instrument 7 is closed by the release lever 10 which is insulated with respect to the body of the camera. The inner end 10a of the lever stands in the path of the projection 6a of the aluminium ring 6 and thus holds the rotary shutter in a position in which the photo-cell is in front of the objective aperture. The outer end 10b of the release lever is insulated with respect to the body of the camera.

The measuring operation may consist, for instance, in bringing, with aid of the diaphragm 3, the pointer 7a of the measuring instrument, before each exposure and while the object is sighted in the view-finder, to a definite position which is determined by the indication of the sensitivity of the film in degrees "Scheiner", or by the name of the film material itself. Preferably, the scale 7b is pivoted to turn and snaps into a notch when the speed of photography of the camera (number of pictures to be taken per second) appears in a lower window, as indicated in Fig. 3.

Alternatively, the measuring operation may consist in opening fully the diaphragm 3 and then adjusting it to the reading on the scale 7b. It is also advantageous for the diaphragm scale to turn on a pivot, relatively to the pointer, so that the instrument can be adjusted for film material of varying sensitivity. With this object in view the mark 11 is brought into register with one of the marks 12. The marks 12 correspond with the main types of film used, the sensitivity of which can be given in figures (degrees "Scheiner"). The photo-electric cell can, of course, be attached to a circular slide, slot shutter or the like in a photographic camera, preferably a box camera.

What we claim is:

1. In a photographic camera in combination, a casing, a lens mount mounted on said casing, an objective in said lens mount, a diaphragm mounted within said objective, a shutter comprising a metal plate mounted in proper relation to said objective for closing the picture aperture when the shutter is in its rest position, a rectifier photo-cell mounted on said metal plate in alignment with said objective, means for indicating the electric current excited in said photo-cell by the light projected thereon, and means for conducting the electric current excited in said photo-cell to said indicating means.

2. In a photographic camera in combination, a casing, a lens mount mounted on said casing, an objective in said lens mount, a diaphragm mounted within said objective, a shutter comprising a metal plate mounted in proper relation to said objective for closing the picture aperture when the shutter is in its rest position, a rectifier photo-cell mounted on said metal plate in alignment with said objective, means for indicating the electric current excited in said photo-cell by the light projected thereon, means for conducting the electric current excited in said photo-cell to said indicating means, and means for interrupting said conducting means while said shutter is in operation.

3. In a motion picture camera in combination, a casing, a lens mount mounted on said casing, an objective in said lens mount, a diaphragm mounted within said objective, a shutter comprising a metal plate rotatably mounted in proper relation to said objective, a rectifier photo-cell mounted on said metal plate, means for stopping the rotation of said shutter in such predetermined position that the photo-cell is aligned with the objective, means for indicating the electric current excited in said photo-cell by the light projected thereon, means for conducting the electric current excited in said photo-cell to said indicating means, and means for interrupting said conducting means while said shutter is in operation.

4. In a motion picture camera in combination, a casing, a lens mount mounted on said casing, an objective in said lens mount, a diaphragm mounted within said objective, an axle rotatably mounted in said casing, a shutter comprising a metal plate mounted on said axle, a rectifier photo-cell mounted on said metal plate, means for stopping the rotation of said shutter in such predetermined position that the photo-cell is aligned with said objective, means for indicating the electric current excited in said photo-electric cell by the light projected thereon, means for conductively connecting said axle with said means for indicating said electric current, a projection on said photo-cell, a lever mounted on said casing and capable of being brought into the way of said projection of the photo-cell thus stopping said shutter, and conductive means for connecting said casing with said means for indicating said electric current.

ALFRED LINGG.
SIEGFRIED GELIUS.